United States Patent [19]

Pradeep et al.

[11] Patent Number: 5,682,139
[45] Date of Patent: Oct. 28, 1997

[54] RAILCAR LOCATION USING MUTTER NETWORKS AND LOCOMOTIVE TRANSMITTER DURING TRANSIT

[75] Inventors: Anantha Krishnan Pradeep, Clifton Park; Daniel David Harrison, Delanson; Glen William Brooksby, Glenville; Stephen Michael Hladik, Albany, all of N.Y.

[73] Assignee: General Electric Company, Schenectady, N.Y.

[21] Appl. No.: 484,752

[22] Filed: Jun. 7, 1995

[51] Int. Cl.⁶ ................. G08B 1/08; H04B 1/00
[52] U.S. Cl. ........... 340/539; 340/825.49; 340/825.54; 340/825.07; 340/991; 340/825.36; 455/54.1; 455/53.1; 455/12.1; 364/132; 342/457
[58] Field of Search .................. 340/933, 991, 340/992, 539, 825.49, 825.54, 825.07, 825.08–825.13, 825.69, 825.72, 825.36; 455/11.1, 9, 12.1, 13.1, 54.1, 53.1, 56.1, 33.1; 342/457; 379/59; 364/132

[56] References Cited

U.S. PATENT DOCUMENTS

| | | | |
|---|---|---|---|
| 4,651,157 | 3/1987 | Gray et al. | 342/457 |
| 4,742,357 | 5/1988 | Rackley | 342/457 |
| 4,750,197 | 6/1988 | Denekamp et al. | 340/825.35 |
| 4,897,642 | 1/1990 | DiLullo et al. | 340/825.54 |
| 5,021,938 | 6/1991 | Hayakawa | 364/132 |
| 5,053,964 | 10/1991 | Mister et al. | 364/424.01 |
| 5,225,842 | 7/1993 | Brown et al. | 342/357 |
| 5,355,511 | 10/1994 | Hatano et al. | 455/11.1 |
| 5,379,224 | 1/1995 | Brown et al. | 364/449 |

*Primary Examiner*—Donnie L. Crosland
*Attorney, Agent, or Firm*—Marvin Snyder

[57] ABSTRACT

A method of tracking railcars in transit using global positioning techniques involves determining the location of a railcar by using a Global Positioning System (GPS) receiver and a satellite transceiver on board the locomotive, and a local area network of railcar tracking units. Instead of computing the GPS solution independently and transmitting it to a central station, the railcar tracking units transmit their unique identifications (IDs) to one of the tracking units in the local area network acting as an administrator tracking unit. The administrator tracking unit maintains a list of IDs and periodically transmits the list of IDs to the locomotive. The locomotive locates itself using the GPS system and periodically transmits its position and velocity to the central station.

4 Claims, 5 Drawing Sheets

RAILCAR LOCATION USING MUTTER NETWORKS AND LOCOMOTIVE TRANSMITTER DURING TRANSIT

BACKGROUND OF THE INVENTION

1. Field of the Invention

This invention relates to asset tracking and, more particularly, to tracking of assets, such as railcars, during transit, using the Global Positioning System (GPS).

2. Background Description

Goods shipped from a manufacturing plant, warehouse or port of entry to a destination are normally tracked to assure their timely and safe delivery. Tracking has heretofore been accomplished in part by use of shipping documents and negotiable instruments, some of which travel with the goods and others of which are transmitted by post or courier to a receiving destination. This paper tracking provides a record which is completed only on the safe delivery and acceptance of the goods. However, there sometimes is a need to know the location of the goods while in transit. Knowledge of the location of the goods can be used for inventory control, scheduling and monitoring.

Shippers have provided information on the location of goods by tracking their vehicles, knowing what goods are loaded on those vehicles. Goods are often loaded aboard shipping containers or container trucks, for example, which are in turn loaded aboard railcars. Various devices have been used to track such vehicles. In the case of railcars, passive radio frequency (RF) transponders mounted on the cars have been used to facilitate interrogation of each car as it passes a way station and supply the car's identification (ID). This information is then transmitted by a radiated signal or land line to a central station which tracks the locations of cars. This technique, however, is deficient in that any train on a siding cannot pass a way station until it has left the siding, which could involve a considerable delay. Moreover, way station installations are expensive, requiring a compromise that results in way stations being installed at varying distances, depending on the track layout. Thus, the precision of location information varies from place to place on the railroad.

Recently, mobile tracking units have been used for tracking various types of vehicles, such as trains. Communication has been provided by means of cellular mobile telephone or RF radio link. Such mobile tracking units are generally installed aboard the locomotive which provides a ready source of power. However, in the case of shipping containers, container track trailers and railcars, a similar source of power is not readily available. Mobile tracking units which might be attached to containers and vehicles must be power efficient in order to provide reliable and economical operation.

Most current asset tracking systems are land-based systems wherein a radio unit on the asset transmits information to wayside stations of a fixed network, such as the public land mobile radio network or a cellular network. These networks do not have ubiquitous coverage, and the asset tracking units are expensive. A satellite-based track tracking system developed by Qualcomm Inc., known as OMNITRACS, is in operation in the United States and Canada. This system requires a specialized directional antenna and considerable power for operation, while vehicle location, derived from two satellites, is obtained to an accuracy of about one-fourth kilometer. A rail vehicle positioning system described in U.S. Pat. No. 5,129,605 to Burns et al. is installed on the locomotive of a train and uses, as inputs to generate a location report, a GPS receiver, a wheel tachometer, transponders, and manual inputs from the locomotive engineer. While the Burns et al. system is accurate for locating a locomotive, it is not adaptable for locating individual railcars in a train. The problem of locating railcars is exacerbated by the fact that railcar's in a consist may be removed or added during a particular locomotive's transit from a starting point to an ultimate destination. Therefore, knowledge of a locomotive's location is not a reliable indication of the location of railcars.

In an asset tracking system disclosed in U.S. application Ser. No. 08/484,750 entitled "Local Communication Network for Power Reduction and Enhanced Reliability in a Multiple Node Tracking System" by Welles et al. and in U.S. application Ser. No. 08/487,272, now U.S. Pat. No. 5,588,005 entitled "Protocol and Mechanism for Primary and Mutter Mode Communication for Asset Tracking" by Ali et al., both filed concurrently herewith, assigned to the instant assignee and incorporated herein by reference, a tracking system based on a "mutter" mode local area network is used to generate data which are transmitted to a central station. In this asset tracking system, there are two modes of communication. One mode is communication between the central station and the tracking units, which is usually via satellite. The second mode is a local area network, referred to as the "mutter" mode, between tracking units. One of the mobile units, denoted the master unit, communicates with the central station. While this asset tracking system is a reliable and accurate system for tracking assets during transit, it would be desirable to provide a GPS receiver and satellite for use of a locomotive in conjuction mobile tracking units on board the railcars and joined in a local area network (LAN).

SUMMARY OF THE INVENTION

It is therefore an object of the invention to provide a system for global localization of railcars in transit.

Another object of the invention is to provide a method for tracking railcars in transit that does not require an unlimited power source.

According to the invention, location of a railcar is determined using a GPS receiver and a satellite transceiver on board the locomotive and a LAN of railcar tracking units. Instead of computing the GPS solution independently and transmitting it to a central station, the railcar tracking units transmit their unique IDs to one of the tracking units in the LAN which acts as an administrator unit. The administrator unit, in turn, maintains a list of IDs and periodically transmits the list of IDs to the locomotive. The locomotive locates itself using the GPS system and periodically transmits its position and velocity to the central station.

More particularly, the LAN formed by the tracking units on board the railcars in a train is termed a "mutter" network, and selects a master tracking unit which serves as an administrator unit. The other tracking units in the network operates as slaves to the selected master unit. The administrator unit of the network communicates with the transceiver of the locomotive. The locomotive contains a GPS location device in conjunction with an on-board transceiver used to communicate with the central station. The administrator unit transmits to the locomotive transceiver a list of railcar IDs in the LAN. The locomotive transceiver then transmits to the central station, via appropriate medium, the list of railcars along with the location and velocity of the locomotive. On reaching the destination, just before turning itself off, the locomotive transceiver sends to the central station the list of railcar IDs and their current location as calculated by the locomotive GPS receiver.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF A PREFERRED EMBODIMENT OF THE INVENTION

Figure 1:
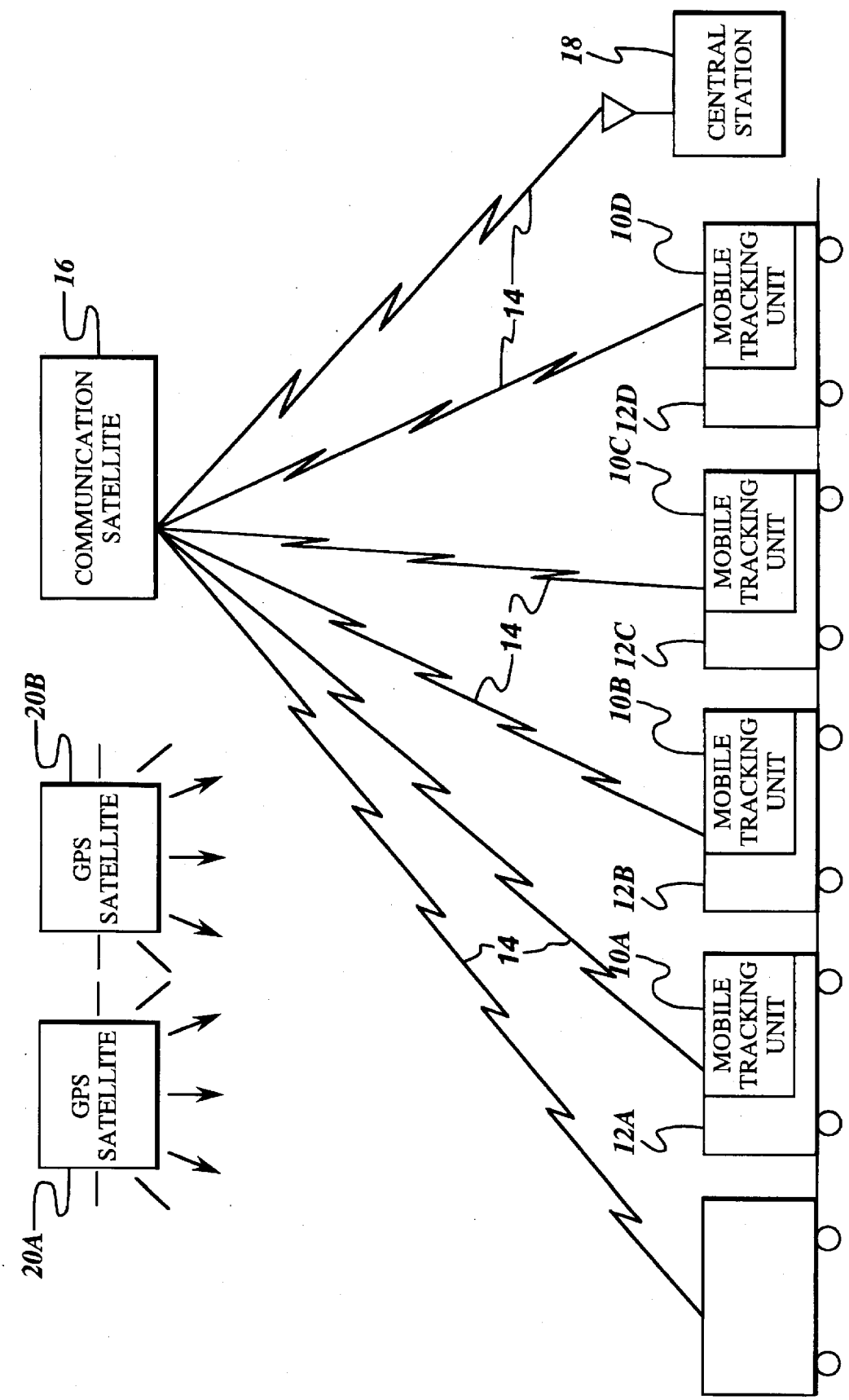
FIG. 1 is a block diagram of an exemplary asset tracking system which employs mobile tracking units and operates in accordance with the method of the present invention.

FIG. 1, illustrates mobile tracking units which employ navigation signals from a GPS satellite constellation, although, as suggested above, other navigation systems can be used in lieu of GPS. A set of mobile tracking units 10A–10D are installed in respective railcars 12A–12D, which are to be tracked or monitored. A communication link 14, such as a satellite communication link through a communication satellite 16, is provided between the locomotive and a remote central station 18 manned by one or more operators and having suitable display devices and the like for displaying location and status information for each railcar equipped with a respective mobile tracking unit. Communication link 14 can be conveniently used for transmitting vehicle conditions or events measured with suitable sensing elements. Communication link 14 may be one-way (from the locomotive to the central station) or two-way. In a two-way communication link, messages and commands can be sent to the locomotive transceiver, thereby further enhancing reliability of the communication. A constellation of GPS satellites, such as GPS satellites 20A and 20B, provides highly accurate navigation signals which can be used to determine vehicle location and velocity when the signals are acquired by a suitable GPS receiver.

Briefly, the GPS was developed by the U.S. Department of Defense and gradually placed into service throughout the 1980s. The GPS satellites constantly transmit radio signals in L-Band frequency using spread spectrum techniques. The transmitted radio signals carry pseudorandom sequences which allow users to determine location on the surface of the earth (within approximately 100 feet), velocity (within about 0.1 MPH), and precise time information. GPS is a particularly attractive navigation system to employ, being that the respective orbits of the GPS satellites are chosen so as to provide world-wide coverage and being that such highly-accurate radio signals are provided free of charge to users by the U.S. federal government.

Figure 2:
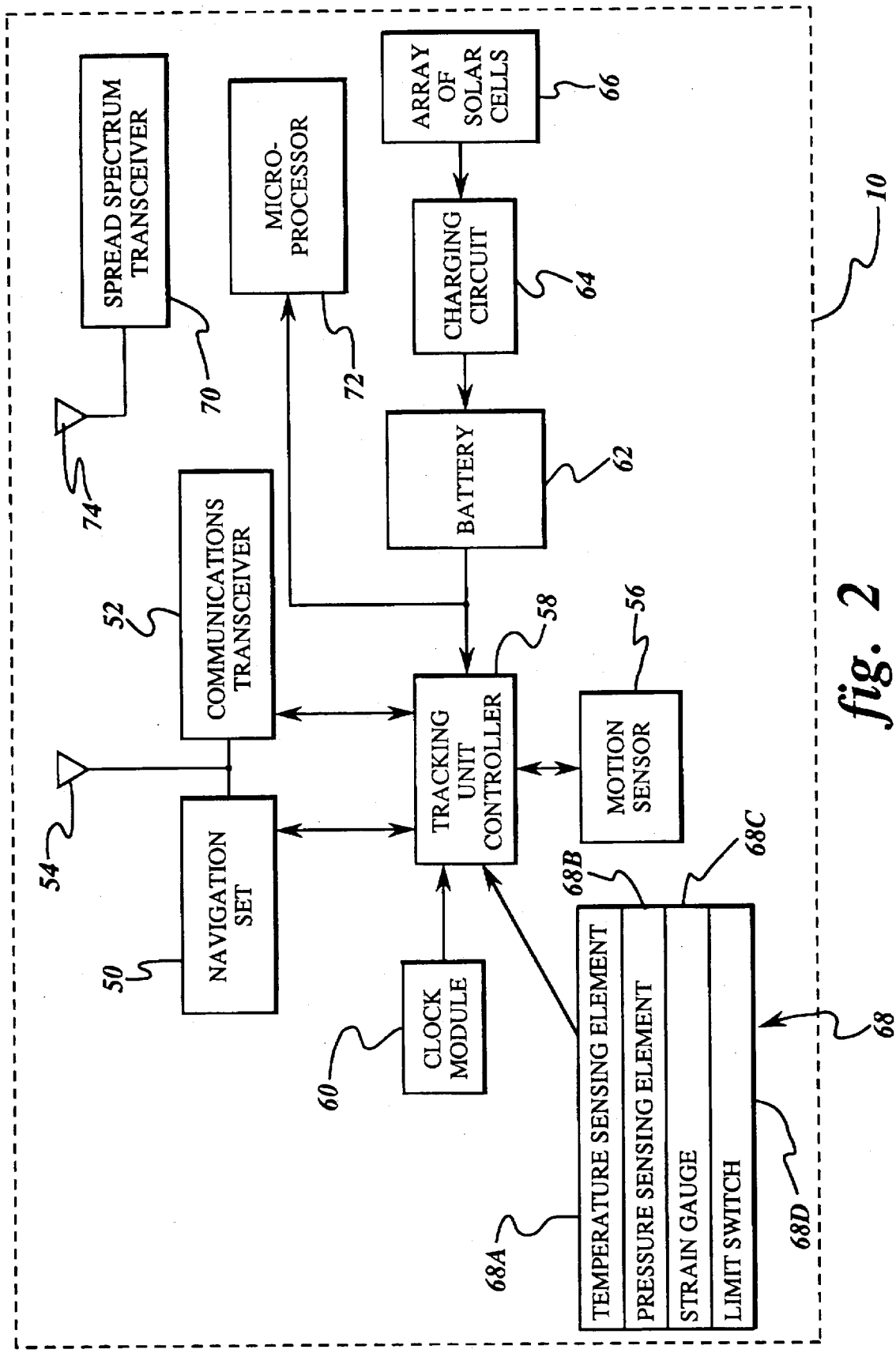
FIG. 2 is a block diagram showing in further detail a mobile tracking unit as used in the asset tracking system shown in FIG. 1.

A locomotive mobile tracking unit, such as shown in FIG. 2, includes an on board navigation set 50 capable of generating data substantially corresponding to the locomotive location. Choice of navigation set depends on the particular navigation system used for supplying navigation signals to the mobile tracking unit. Preferably, the navigation set is a GPS receiver such as a multichannel receiver; however, other receivers designed for acquiring signals from a corresponding navigation system may alternatively be employed. For example, depending on the locomotive location accuracy requirements, the navigation set may comprise a Loran-C receiver or other such less highly-accurate navigation receiver than a GPS receiver. Further, the navigation set may conveniently comprise a transceiver that inherently provides two-way communication with the central station and avoids the need for separately operating an additional component to implement such two-way communication. Briefly, such transceiver would allow for implementation of satellite range measurement techniques being that the position of the locomotive is simply determined at the central station by range measurements to the locomotive and the central station from two satellites whose position in space is known. A key advantage of the present invention is the ability to substantially reduce the total energy required by the mobile tracking units on board a train propelled by the locomotive by utilizing the effectively unlimited power of the locomotive for the GPS navigation set and the transceiver for communicating with the central station.

Mobile tracking unit 10, as shown in FIG. 2, includes a suitable electromagnetic transceiver 52, which may comprise a commercially available spread spectrum transceiver such as those currently being utilized in wireless LANs. A low profile antenna 54 is coupled to transceiver 52 and navigation set 50, to serve both. Both transceiver 52 and navigation set 50 are activated by a controller 58 which, in turn, is responsive to signals from a clock module 60. Transceiver 52 is capable of transmitting the vehicle location data by way of communication link 14 (FIG. 1) to the central station and receiving commands from the central station by way of the same link. If a GPS receiver is used, the GPS receiver and the transceiver can be conveniently integrated as a single unit for maximizing efficiency of installation and operation. An example of one such integrated unit is the Galaxy InmarsatC/GPS integrated unit, which is available from Trimble Navigation, Sunnyvale, Calif., and is conveniently designed for data communication and position reporting between the central station and the mobile tracking unit.

A low power, short distance radio link permits joining the nearby mobile tracking units in a network to conserve power and maintain high reliability and functionality of such network. Each tracking unit also includes a power source (which comprises a battery pack that can be charged by an array of solar cells 66 through a charging circuit 64), and various system and vehicle sensors 68A–68D, as well as a low power local transceiver 70 and a microprocessor 72. Microprocessor 72 is interfaced to all of the other elements of the tracking unit and has control over them. Transceiver 70 may be a commercially available spread spectrum transceiver such as those currently utilized in wireless local area networks. Spread spectrum transceiver 70 is equipped with its own low profile antenna 74.

Figure 3:
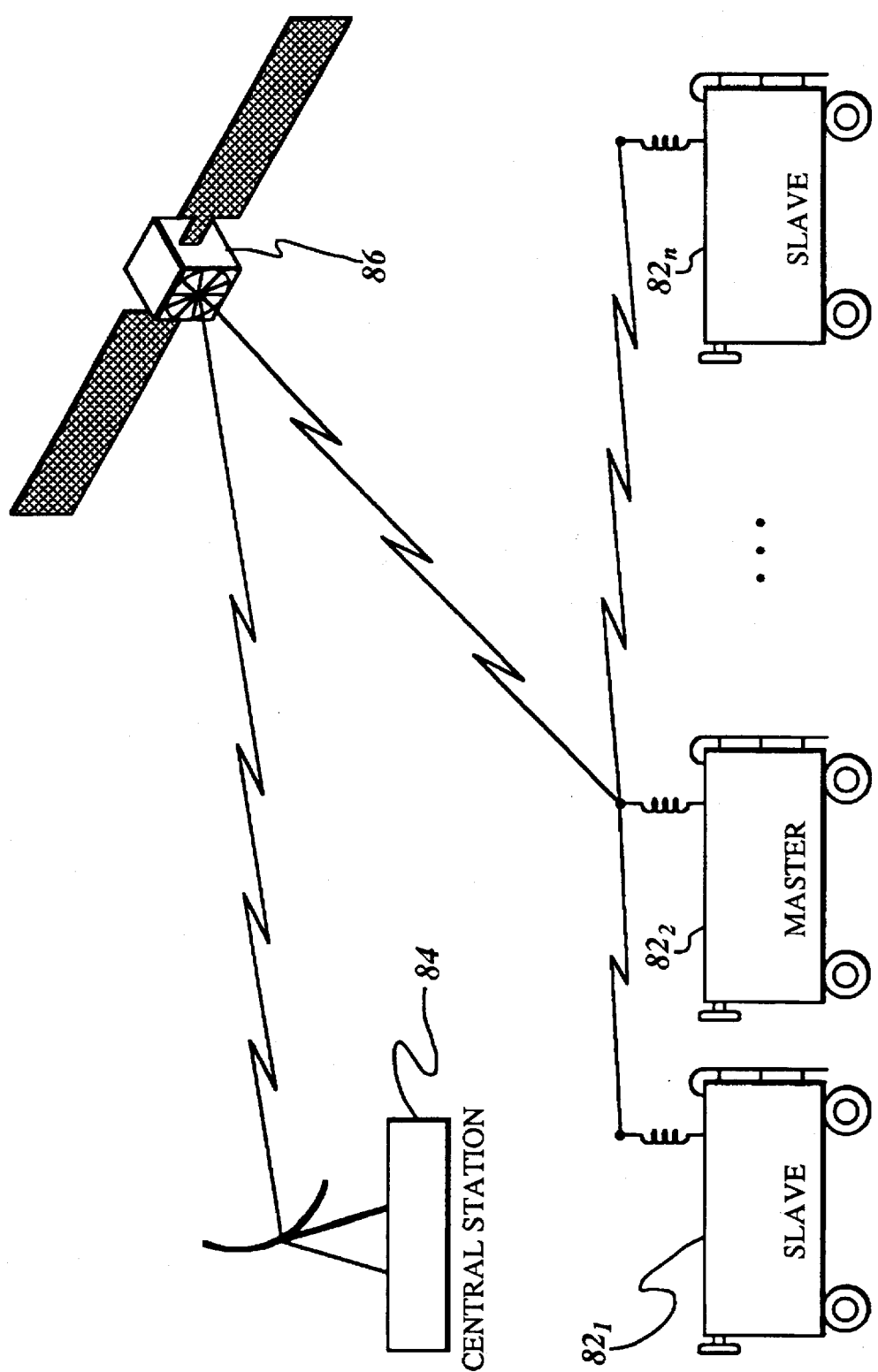
FIG. 3 is a block diagram illustrating organization of the mobile local area network implemented by the present invention.

Utilizing local transceiver 70, microprocessor 72 communicates with all other tracking units within communications range. When a train has multiple freight cars $82_1, 82_2, \ldots, 82_n$ equipped with these tracking units, as shown in FIG. 3, all of these units exchange information. Because the microprocessors are interfaced to their own power sources, the status of available power for each tracking unit can also be exchanged. In accordance with the inventions disclosed in the aforementioned applications Ser. No. 08/484,750 entitled "Local Communication Network for Power Reduction and Enhanced Reliability in a Multiple Node Tracking System" by Welles et al. and Ser. No. 08/487,272 entitled "Protocol and Mechanism for Primary and Mutter Mode Communication for Asset Tracking" by Ali et al., the tracking unit with the most available power (i.e., most fully charged batteries) will become the designated master unit, the other units being slave units. The master unit performs the GPS position and velocity data reception function, assembles these data along with the IDs of all other tracking units on the train, and transmits this information periodically in a single packet to a central station 84 via communication satellite 86.

In accordance with the present invention, the master tracking unit does not perform the GPS location and velocity reception function; rather, this function is performed by the GPS system on board the locomotive, thereby saving considerable power in the operation of the master tracking unit. The master tracking unit performs all the other functions as described above, including maintaining a list of IDs of the members of the mutter group. The master tracking unit periodically transmits this information to the locomotive. The locomotive, in turn, locates itself using the GPS system and transmits its location and the data collected by the master tracking unit of the mutter network to the central station. The master tracking unit thus performs the function of a network administrator, leaving the power demanding functions to the locomotive.

To implement the protocol according to the invention, a two-way communication link between the locomotive transceiver and each of the asset tracking units is first established. This protocol is preferably a Time Division Multiple Access (TDMA) protocol. The TDMA protocol requires each tracking unit to transmit in an assigned time slot during which no other unit transmits. A TDMA system requires tracking units to be time synchronized to prevent message "collisions" (i.e., interference between simultaneously transmitted signals). This can be accomplished using GPS absolute time as a reference transmitted by the locomotive transceiver, for example. The various tracking units are also assigned transmission frequencies and time slots by the central station.

The tracking units, using the TDMA system, transmit on the assigned frequency and time slot. The locomotive transceiver receives data from the different tracking units, and an on-board computer decodes the information and stores the information in a table. Each row of the table has at least three entries; namely, unit ID, battery strength and signal quality. Signal quality can be selected to be received signal strength, bit error rate measured over a known sync word or carrier-to-interference ratio. The tracking units are framed into a LAN referred to as a "mutter" group. The master tracking unit periodically polls the tracking units in its mutter group, and the collected data are then transmitted by the master unit to the locomotive transceiver and thence via satellite link to the central station. This conserves battery power as other tracking units in the mutter group, especially those with low battery power, do not have to transmit except at infrequent intervals.

The master tracking unit is selected as follows. From each of the groups in the table generated by the computer on board the locomotive, the tracking units are sorted by battery strength and signal quality to determine the unit with not only the best battery strength but also the one with the best propagation path to the satellite. If no single tracking unit is best in both categories, a compromise, or trade-off is made. Use of the signal quality measure in selecting the best tracking unit helps overcome effects such as shadowing, and provides inherent diversity. That is, if the tracking unit with the highest battery strength is under a canopy (e.g., tunnel, foliage, ice or awning), then there is no point in choosing that unit to forward the group's data to the locomotive tracking unit as considerable power must be expended to overcome the attenuation of the canopy.

Alternatively, the locomotive computer and transceiver can act as the master unit and all the tracking units attached to railcars in the consist serve as slave units to the locomotive unit. This has the advantage of providing the master unit with access to the unlimited power available to the locomotive. A priming/disadvantage of this arrangement is that a train can be quite long, requiring much battery power and signal strength to transmit a good quality signal from a remote end of the train to the locomotive. This can result in loss of reliability of the diversity of the mutter network. If the master tracking unit can be selected to be at a location near the middle of the train, the average distance of transmission from a slave unit to the selected master unit is reduced, thereby improving reliability of the signal.

Figure 4:
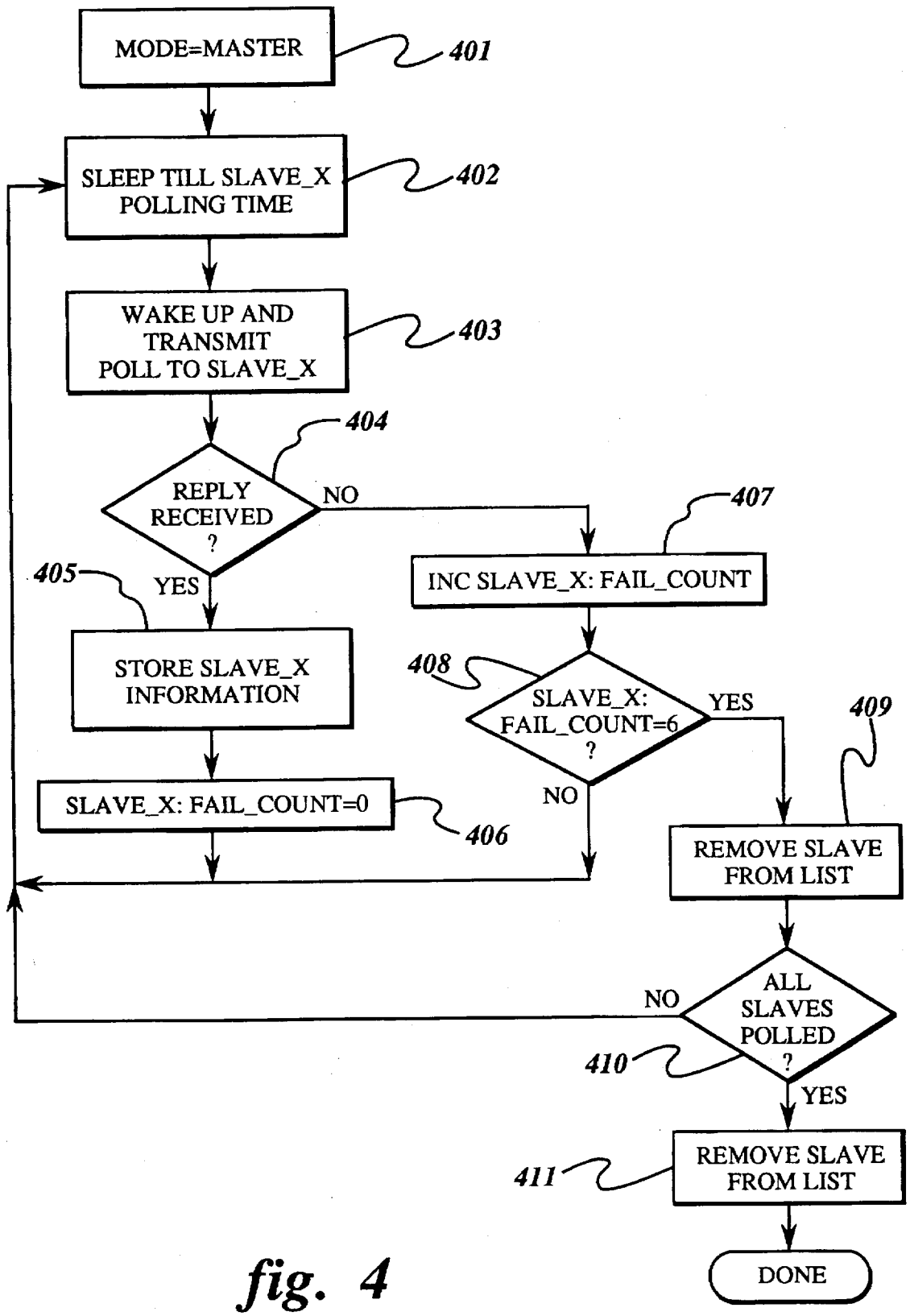
FIG. 4 is a flow diagram showing the steps in operation of the selected master tracking unit.

FIG. 4, illustrates the process implemented by the tracking unit selected to be the master unit in the mutter group forming the LAN. On a periodic basis, the master tracking unit, acting as the network administrator of the mutter group, polls the tracking units in its list and waits for a response. For each slave unit, the master unit goes through a similar logic. The tracking unit mode is set to master at step 401. The master unit is in a standby or "sleep" mode until the slave unit polling time at step 402. At that time, the master unit is activated, or "wakes up", and transmits a poll to the slave unit at step 403. A test is then made at decision step 404 to determine whether a reply was received from the slave unit. If so, the information received from the slave unit is stored at step 405, and the failure count for that slave unit is set to zero at step 406. The process then loops back to function block 402. If, however, a reply is not received from the slave unit, the failure count for that unit is incremented at step 407. A test is made at decision step 408 to determine if the failure count for that slave unit is equal to six. If not, the process loops back to step 402; otherwise, the slave unit is removed from the master's slave list at step 409. Next, a test is made at decision step 410 to determine if all the slaves on the master's slave list have been polled. If not, the process loops back to step 402. When all the slave tracking units have been polled and at a predetermined time, the master tracking unit transmits the collected data to the locomotive at step 411, and the process exits.

Figure 5:
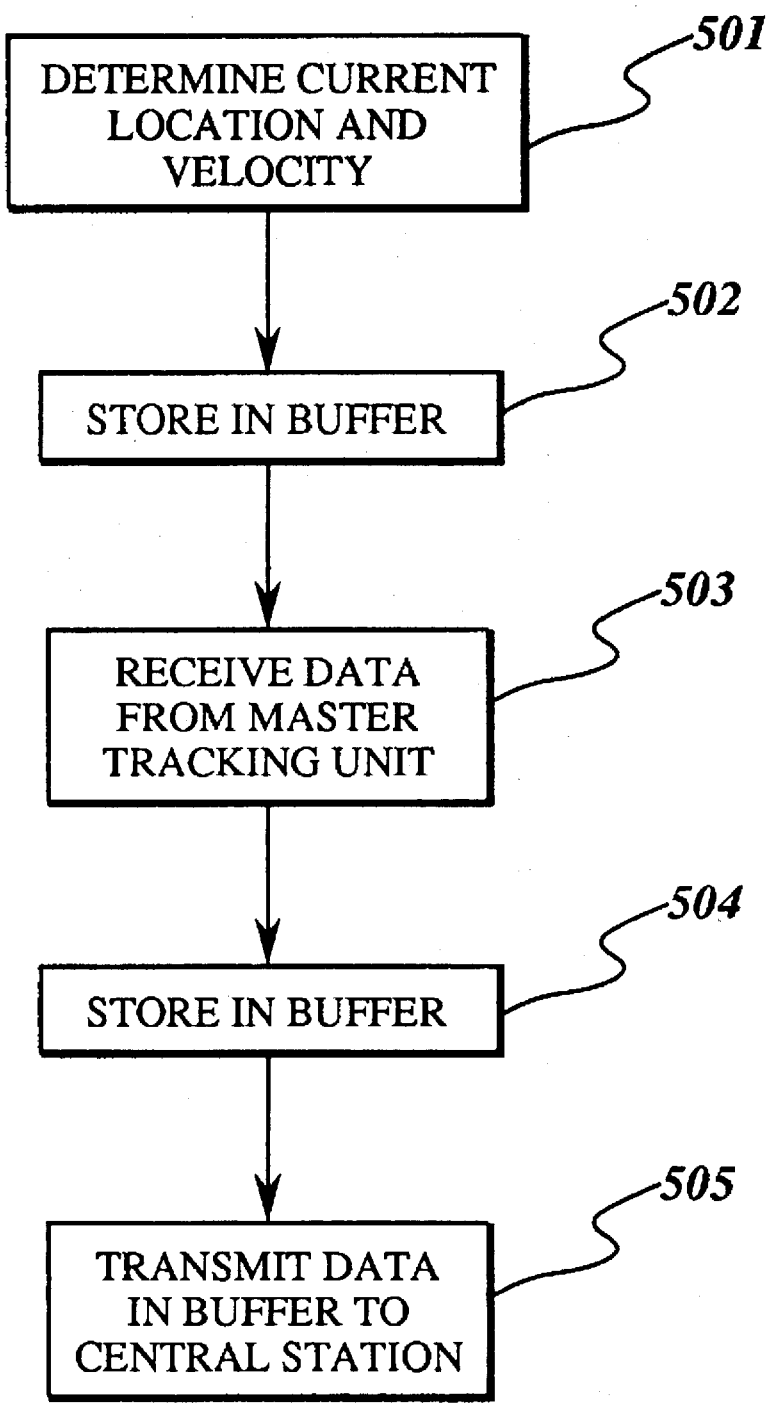
FIG. 5 is a flow diagram showing the steps in operation of the computer on board the locomotive.

FIG. 5 illustrates by way of a flow diagram the process implemented by the computer on board the locomotive. The locomotive, using its GPS receiver (i.e., navigation set) periodically determines its current location and velocity, as indicated at step 501. These data are temporarily stored in a frame buffer at step 502. The locomotive transceiver awaits the transmission from the master tracking unit during a time window centered on the predetermined time of transmission by the master tracking unit at step 503. The data received from the master tracking unit acting as the administrator unit of the mutter group is also temporarily stored in the frame buffer at step 504. Finally, during its assigned time slot, the locomotive transceiver transmits the data accumulated in the frame buffer to the central station at step 505.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

Having thus described our invention, what we claim as new and desire to secure by Letters Patent is as follows:

1. A method of tracking railcar's in a train including a locomotive, said locomotive including a global positioning satellite (GPS) receiver and a transceiver for communicating with a central station, said method comprising the steps of:

affixing a battery powered tracking unit to each one of a plurality of railcars in the train;

forming a local area network of tracking units in the train, said local area network including a single administrator tracking unit selected among the tracking units;

periodically reporting a unique identification (ID) from each respective one of said tracking units in the network to the administrator tracking unit;

maintaining by the administrator tracking unit a list of tracking units by ID;

periodically reporting from the administrator tracking unit to the transceiver the list of tracking units; and periodically reporting from the transceiver to a central station a GPS position and the list of tracking units.

2. The method of tracking railcars in a train as recited in claim 1 and further comprising the step of updating the list of tracking units by the administrator tracking unit when railcars are removed or added to the train.

3. The method of tracking railcars in a train as recited in claim 2 and further comprising the steps of:

periodically transmitting polls at specified times from the administrator tracking unit to tracking units on the list of tracking units;

determining whether a response has been received from each tracking unit polled by the administrator;

counting by the administrator unit, for each tracking unit on the list a number of consecutive failures to receive a response from polls; and removing from the list of tracking units any tracking unit for which the number of consecutive failures exceeds a predetermined value.

4. The method of tracking railcars in a train as recited in claim 3 and further comprising the step of notifying the central station from the transceiver that a tracking unit has been removed from the list of tracking units for the train.

* * * * *